June 2, 1970   S. E. KIVELA   3,515,119
FOOD CARRYING AND PREPARING APPLIANCE
Filed Oct. 30, 1967

Stanley E. Kivela
INVENTOR.

3,515,119
FOOD CARRYING AND PREPARING
APPLIANCE
Stanley Edward Kivela, Rte. 1, Box 94,
Marengo, Wis. 54855
Filed Oct. 30, 1967, Ser. No. 678,986
Int. Cl. F24c 1/02, 1/16, 15/18
U.S. Cl. 126—37                                                        8 Claims

ABSTRACT OF THE DISCLOSURE

This invention is a food carrying and preparing appliance that provides, in a very portable form, the following items: A drop front that can be opened to a horizontal position in which can be built one or more heating units, using various fuels, for the heating and preparation of foods and lunches. An insulated storage drawer is provided in which food can be stored for protection against excessive heat and cold. Further storage space is provided in the upper part of the item. Controls for the heating units are built into the item.

---

Figure 1:
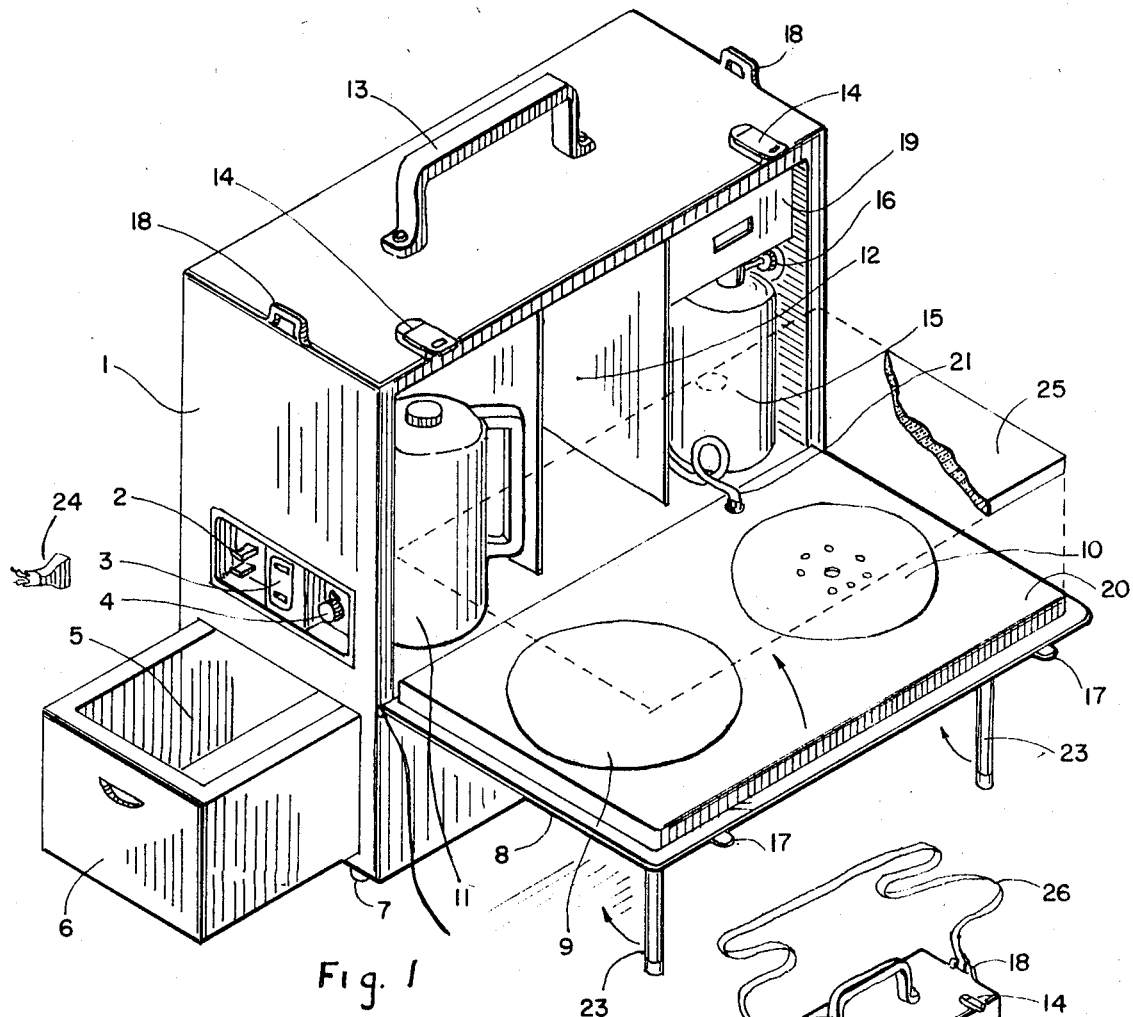

The purpose of this invention is to provide a convenient method of carrying a lunch, preparing or heating the food, and doing this in an appliance that is convenient to store, carry, and use.

A further purpose is to provide an independent heat source, such as propane in cylinder form, under pressure, to supply heat energy for at least one burner, in the event that electric current is not available. However, it can be manufactured with either all gas, or all electric heating units.

There follows a description of the various parts comprising this invention with reference numerals; like numerals referring to the same or similar parts in the various views.

FIG. 1: This is a perspective view of the invention with the cooking top, drop front, lowered into position for use, an insulating protector is shown in fragmentary view, with its extent shown by dotted lines in phantom view. The insulated storage drawer is partially open.

Figure 2:
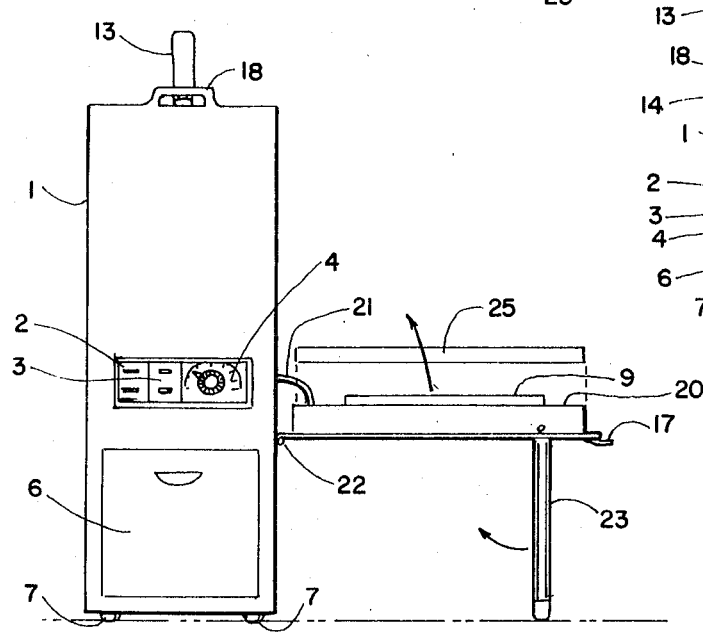

FIG. 2: This is an elevation view showing the drop front lowered and the plug in receptacles, the heat controls, and insulated drawer. The folding support legs are folded out to support cooking top.

Figure 3:
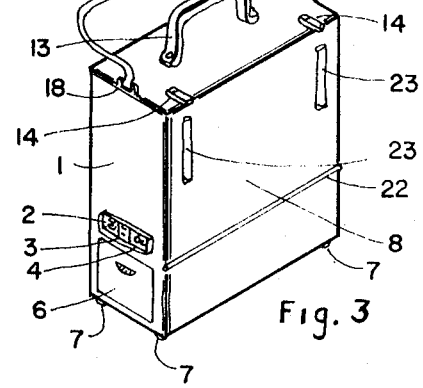

FIG. 3: This is a perspective view of the appliance as it would be when the drop front is closed up ready for carrying.

Referring to FIG. 1, it shows the invention to be essentially in a suitcase, satchel, or case configuration and is referred to by 1. It has a drop front 8 that lowers into position on hinge 22 and is supported by fold out legs 23.

The top 20 has two burners. In this configuration shown, it has an electric burner 9 and a gas burner or heating unit 10.

The electric surface unit is connected to the male outlet at 2. This outlet is also wired to the convenience outlet 3 and the heat control and on-off switch 4 that regulates the current going to surface unit 9, which regulates the amount of heat generated by the surface unit.

The convenience outlet is intended to provide a convenient plug in for an appliance such as the percolator 11. The combined wattage of percolator 11 and burner 9 not to approach the capacity of extension cord 24 or the usual 15 ampere capacity of the ordinary convenience circuit and outlet.

The propane burner 10 is connected by flexible connection 21 to cylinder 15. A shut off and adjusting valve at 16 regulates flow to burner 9. The appliance 1 is supported by scuff protecting feet 7 on the bottom of the case.

In the case 1, below the level of surface 8, when lowered, is built an insulated storage drawer 6 with a storage space 5. This space can be used to store any selected foods, and if desired, Dry Ice for temporary refrigeration.

In the case 1, above the level of surface 8, when lowered, the available storage space can be designed in a variety of ways to utilize the space. As shown, space is provided for a small percolator as at 11 and a storage space 12. Above the gas cylinder is a small drawer 19.

When not in use, the top 8 is folded up against case on hinge 22. Catches 14 engage prongs 17 keeping it closed. Legs 23 are folded in as shown in FIG. 3.

There is a certain amount of residual heat remaining after use, and the protective, insulating board 25 shown in fragmentary view in FIG. 1 and in FIG. 2 protects against this. Before closing up case, this insulating board 25 is placed over top 20. When in use, this insulating board can be used as a tray, or coaster when appliance is in use.

Front 8 is insulated to protect user after use when front is closed. Storage space 12 can be utilized in various ways, such as removable shelves, or insertable containers.

At times, when carrying an item like this, it has to be set down, or other items carried. For this purpose a shoulder strap 26 is attached to appliance 1 at points 18.

Storage drawer 6 can also be used to carry a Thermos bottle.

It can be seen that this basic design of this invention can be changed and manufactured in various ways without departing from the spirit of the invention.

Therefore it is not intended to limit the construction to the exact form as shown and all forms of the invention may be resorted to under the invention as claimed.

What is claimed as new is as follows:

1. In a food carrying and preparing appliance comprised, essentially, of a six sided case, with carrying handle, that has a portion of one side hingeably secured to said case, said portion can be lowered to an essentially horizontal plane when appliance is placed on a reasonably level surface, with said hinging portion having operably positioned into it, heating means for the heating of food and disposed in said case, space for the storage of food and utensils, with said hinged portion in which said heating means are positioned, is insulated so as to assist in protecting user and any adjacent item after use of said appliance when said hinged portion is in a closed position, from residual heat and further, in use with this appliance, an insulating panel, operably positioned between surface containing said heating means and interior of said appliance case, to protect any contents therein from excessive residual heat emanating from said heating means after appliance has been used and is closed up, if sufficient time is not allowed for the appliance's heating means to cool.

2. The appliance of claim 1 wherein the food heating means in hinged portion use electric current with heat regulating means operably connected thereto with electric cord means operably secured to said case for connection to a current source, such as a detachable appliance cord.

3. The appliance of claim 1 wherein there are operably disposed in said hingeably secured portion, fold out support means, that support said hinged portion in an essentially horizontal position when said appliance is placed upon an essentially level supporting surface; and with said appliance, and in a portion of interior of said appliance that is not operably related to said hinged portion, a space, capable of receiving a storage drawer and a storage drawer slidably engaged therein in which can be stored food stuffs, utensils, or any other needed items.

4. The appliance of claim 3 wherein the said food heating means use only electric current for heat energy source.

5. The appliance of claim 3 wherein the said food heating means consist of one utilizing electric current and one utilizing pressurized fuel such as propane.

6. The appliance of claim 3 wherein insulating means are provided so that any contents of said storage drawer are protected from heat and cold.

7. The appliance om claim 3 wherein said storage drawer is operably positioned in said case below the level of the horizontal plane formed when said hingeably secured portion is lowered to its horizontal operating position.

8. In a food carrying and preparing appliance comprised essentially, of a six sided, suit case styled case, with a carrying handle, with a portion of one side hingeably secured to said case and said portion capable of being lowered to an essentially horizontal position when said case is rested or placed upon an essentially horizontal and level surface, with food heating means operably disposed in said hinged portion, and disposed in portions of said case that are not operably connected to hinged portion and heating means, space for the storage of food and utensils with a storage drawer operably disposed in said case along the bottom, essentially as illustrated, and further, in conjunction with said appliance, an insulating panel operably positioned between surface containing said heating means and interior of said case, to protect interior and contents of said case from excess residual heat emanating from said heating means after appliance is used and closed up, and ready for carrying.

References Cited

UNITED STATES PATENTS

| 2,077,687 | 4/1937 | Goldbert et al. | |
| 2,969,054 | 1/1961 | Axelsson | 126—38 |
| 3,064,554 | 11/1962 | Lamb. | |
| 3,272,196 | 9/1966 | Kueser | 126—38 |

FOREIGN PATENTS 744,518   2/1956   Great Britain.

CHARLES J. MYHRE, Primary Examiner

U.S. Cl. X.R.

126—265